US006632573B1

(12) United States Patent
Nimon et al.

(10) Patent No.: US 6,632,573 B1
(45) Date of Patent: Oct. 14, 2003

(54) ELECTROLYTES WITH STRONG OXIDIZING ADDITIVES FOR LITHIUM/SULFUR BATTERIES

(75) Inventors: Yevgeniy S. Nimon, Walnut Creek, CA (US); May-Ying Chu, Oakland, CA (US); Steven J. Visco, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 183 days.

(21) Appl. No.: 09/789,379

(22) Filed: Feb. 20, 2001

(51) Int. Cl.$^7$ .................................................. H01M 6/04
(52) U.S. Cl. ...................... 429/344; 429/199; 429/346; 429/333; 429/329
(58) Field of Search .................................... 429/333, 344, 429/345, 346, 329, 347, 199

(56) References Cited

U.S. PATENT DOCUMENTS

| 3,404,035 A | 10/1968 | Kummer et al. ................ 136/6 |
| 3,413,150 A | 11/1968 | Kummer et al. ................ 136/6 |
| 3,532,543 A | 10/1970 | Nole et al. ....................... 136/6 |
| 3,907,591 A | 9/1975 | Lauck ............................. 136/6 |
| 3,915,743 A | 10/1975 | Lauck ............................. 136/6 |
| 3,947,289 A | 3/1976 | Dey et al. |
| 3,953,231 A | 4/1976 | Farrington et al. ............ 136/6 |
| 4,002,492 A | 1/1977 | Rao ............................ 429/194 |
| 4,143,214 A | 3/1979 | Chang |
| 4,268,587 A | 5/1981 | Farrington et al. ......... 429/193 |
| 4,386,019 A | 5/1983 | Kaun et al. ................. 252/503 |
| 4,410,609 A | 10/1983 | Peled et al. ................. 429/105 |
| 4,436,796 A | 3/1984 | Huggins et al. ............ 429/112 |
| 4,469,761 A | 9/1984 | Bennett et al. ............... 429/50 |
| 4,664,991 A | 5/1987 | Perichaud et al. .......... 429/194 |
| 4,784,925 A | 11/1988 | Klinedinst et al. ............ 429/29 |
| 4,784,927 A | 11/1988 | Klinedinst et al. .......... 429/196 |
| 4,820,599 A | 4/1989 | Furukawa et al. .......... 429/194 |
| 4,833,048 A | 5/1989 | Dejonghe et al. ........... 429/104 |

(List continued on next page.)

FOREIGN PATENT DOCUMENTS

| EP | 0602984 A2 | 6/1994 |
| EP | 0689260 | 12/1995 |
| GB | 2 137406 A | 10/1984 |
| GB | 2 273603 A | 6/1994 |
| GB | 2311410 | 9/1997 |
| JP | 6-275313 | 9/1994 |

OTHER PUBLICATIONS

Abstract of proceedings of the 6$^{th}$ International Symposium of Power Sources 2, 1968, Brighton, Sussex, UK, 24–26, Sep. 1968.
Coleman et al, "The sulfur electrode", Proceedings of the 6$^{th}$ international Symposium of Power Sources, pp. 2889–302, (1968).

(List continued on next page.)

*Primary Examiner*—Laura Weiner
(74) *Attorney, Agent, or Firm*—Beyer Weaver & Thomas, LLP

(57) ABSTRACT

Disclosed are oxidizer-treated lithium electrodes, battery cells containing such oxidizer-treated lithium electrodes, battery cell electrolytes containing oxidizing additives, and methods of treating lithium electrodes with oxidizing agents and battery cells containing such oxidizer-treated lithium electrodes. Battery cells containing $SO_2$ as an electrolyte additive in accordance with the present invention exhibit higher discharge capacities after cell storage over cells not containing $SO_2$. Pre-treating the lithium electrode with $SO_2$ gas prior to battery assembly prevented cell polarization. Moreover, the $SO_2$ treatment does not negatively impact sulfur utilization and improves the lithium's electrochemical function as the negative electrode in the battery cell.

47 Claims, 7 Drawing Sheets

U.S. PATENT DOCUMENTS

| | | | |
|---|---|---|---|
| 4,889,779 A | 12/1989 | Connolly et al. | 429/196 |
| 4,917,974 A | 4/1990 | De Jonghe et al. | 429/104 |
| 5,162,175 A | 11/1992 | Visco et al. | 429/192 |
| 5,523,179 A | 6/1996 | Chu | 429/104 |
| 5,529,860 A | 6/1996 | Skotheim et al. | 429/213 |
| 5,532,077 A | 7/1996 | Chu | 429/102 |
| 5,582,623 A | 12/1996 | Chu | |
| 5,686,201 A | 11/1997 | Chu | |
| 5,691,083 A | 11/1997 | Bolster | |
| 5,698,339 A | 12/1997 | Kawakami et al. | 429/212 |
| 6,017,651 A | 1/2000 | Nimon et al. | |
| 6,030,720 A | 2/2000 | Chu et al. | |
| 6,045,937 A | 4/2000 | Kolb et al. | |
| 6,225,002 B1 | 5/2001 | Nimon et al. | |

OTHER PUBLICATIONS

Visco, S.J., Liu, M., Armand, B. and De Jonghe, L.C., Solid Redox Polymerization Electrodes and Their use in All–Solid–State Batteries, Mol. Cryst. Liq. Cryst., 190, p. 198, 1990.

Societe des Accumulateurs Fixes et de Traction, "Lithium-sulfur battery", Abstracts 111055d, Chemical Abstracts 66: 10360; 1967.

DeGott, P., "Polymere Carbone–Soufre Synthese Et Proprietes Electrochimiques," Doctoral Thesis at l'Institut National Polytechnique de Grenoble, (Date of Defense Jun. 19, 1986).

Lauck, H., "Storage battery with lithium anode and sulfur cathode," Abstract #9855s, Chemical Abstracts, 80: 467–468; 1974.

Peled et al., Rechargeable Lithium–Sulfur Battery (Extended Abstract), Journal of Power Source, 26: 269–271, 1989.

Peled et al.; "Lithium–Sulfur Battery: Evaluation of Dioxolane–Based Electrolytes", J. Electrochem., Soc., 136 (6): 1621–1624, Jun. 1989.

Peramunage and Licht, "A Solid Sulfur Cathode for Aqueous Batteries"; Science 261: 1029–1032, Aug. 20, 1993.

Rauh et al., "Formation of Lithium Polysulfides in Aprotic Media", J. Inorg., Nuc. Chem., 39: 1761–1765, 1977.

Rauh et al. "A Lithium/Dissolved Sulfur Battery with an Organic Electrolyte"; J. Electrochem. Soc., 126(4): 523–527, Apr. 1979.

Yamin and Peled, "Electrochemistry of Nonaqueous Lithium/Sulfur Cell", J. Power Sources, 9: 281–287, 1983.

Yamin et al., Lithium Sulfur Battery,: J. Electrochem. Soc., 135(5): 1045–1048, May 1988.

S.J. Visco, M.M. Doeff, and L.C. De Jonghe, "Thin–Film Technology for Solid–State Lithium Batteries Employing Solid Redox Poly–Merization Cathodes", pp. 89–92, Society of Vacuum Coaters, 1991.

Liu, Meilin, Visco, Steven J., and De Jonghe, Lutgard C., "Novel Solid Redox Polymerization Electrodes Electrochemical Properties", J. Electrochem Soc., vol. 138, No. 7, pp. 1896–1901, Jul. 1991.

Liu, Meilin, Visco, Steven J., and De Jonghe, Lutgard C., "Novel Solid Redox Polymerization Electrodes All–Solid State, Thin–Film, Rechargeable Lithium Batteries", J. Electrochem Soc., vol. 138, No. 7, pp. 1891–1895, Jul. 1991.

Ue, Makoto, Visco, Steven J., and De Jonghe, Lutgard C., "Comparison of Cathode Utilization between Polymeric Organodisulfide and Titanium Disulfide in Solid Polymer Electrode Rechargeable Lithium Cells", Denki Kagaku, vol. 61, No. 12, pp. 1409–1415, 1993.

A. Gavrilov, et al. "In Situ Morphological Study of Lithium–Electrolyte Interface", Electrochemical Society, (Extended Abstract).

Meilin, Lui, "Novel Electrodes for Advanced Energy Storage System"Dissertation of Ph.D. at the University of Berkeley, Chapter 2, pp. 3–6, 1989.

Kavan, L., Novak, P., and Dousek, F.P., "Electrochimica Acto," vol. 33, No. 11, pp. 1605–1612, Mar. 8, 1988, Great Britain.

Brummer, S.B., et al., "Low Temperature Lithium/Sulfur Secondary Battery (Annual Progress Report, Dec. 1, 1974—Dec. 1, 1975)," EIC Corporation, Apr. 1976, Newton, Massachusetts.

Larry A. Dominey, "Lithium Batteries" New Materials, Developments and Perspectives, 1994, New York, Industrial Chemistry Library, vol. 5, pp. 137–165.

Ronald Snaith, et al., "Lithium Chemistry" A Theoretical and Experimental Overview, 1995, New York, John Wiley & Sons, Inc., pp. 227–477.

Wang, Jiqiang, et al. "Investigations of Binary Lithium–Zinc, Lithium–Cadmium and Lithium–Lead Alloys as Negative Electrodes in Organic Solvent–Based Electrolyte", 1986, Solid State Ionics 20, pp. 185–189.

Rao, B.M.L., et al. "Lithium–Aluminus Electrode", Oct. 1977, J. Electrochecm. Soc.: Electrochemical Science and Technology, pp. 1490–1492.

Abraham, K.M., "Some Chemistry in the Li/"$SOCl_2$ +BrCl" Cell", Nov. 1998, J. Electrochem. Soc.: Electrochemical Science and Technology, pp. 2686–2691.

Besenhard, J.O., "Cycling Behavior and Corrosion of Li–Al Electrodes in Organic Electrolytes", 1978, J. Electroanal Chem., 94, pp. 77–81.

ELECTROLYTES WITH STRONG OXIDIZING ADDITIVES FOR LITHIUM/SULFUR BATTERIES

BACKGROUND OF THE INVENTION

This invention relates generally to lithium-sulfur batteries, and in particular to battery electrolytes having additives of oxidizing agents.

The rapid proliferation of portable electronic devices in the international marketplace has led to a corresponding increase in the demand for advanced secondary batteries. The miniaturization of such devices as, for example, cellular phones, laptop computers, etc., has naturally fueled the desire for batteries having high specific energies. In addition, heightened awareness concerning toxic waste has motivated, in part, efforts to replace toxic cadmium electrodes in rechargeable nickel/cadmium batteries with the more benign hydrogen storage electrodes in nickel/metal hydride cells. For the above reasons, there is a strong market potential for environmentally benign battery technologies.

Secondary batteries are in widespread use in modern society, particularly in applications where large amounts of energy are not required. However, it is desirable to use batteries in applications requiring considerable power, and much effort has been expended in developing batteries suitable for high specific energy, medium power applications, such as, for electric vehicles and load leveling. Of course, such batteries are also suitable for use in lower power applications such as cameras or portable recording devices.

At this time, the most common secondary batteries are probably the lead-acid batteries used in automobiles. These batteries have the advantage of being capable of operating for many charge cycles without significant loss of performance. However, such batteries have a low energy to weight ratio. Similar limitations are found in most other systems, such as Ni-Cd and nickel metal hydride systems.

Among the factors leading to the successful development of high specific energy batteries, is the fundamental need for high cell voltage and low equivalent weight electrode materials. Electrode materials must also fulfill the basic electrochemical requirements of sufficient electronic and ionic conductivity, high reversibility of the oxidation/reduction reaction, as well as excellent thermal and chemical stability within the temperature range for a particular application. Importantly, the electrode materials must be reasonably inexpensive, widely available, non-toxic, and easy to process.

Thus, a smaller, lighter, cheaper, non-toxic battery has been sought for the next generation of batteries. The low equivalent weight of lithium renders it attractive as a battery electrode component for improving weight ratios. Lithium provides also greater energy per volume than do the traditional battery standards, nickel and cadmium.

The low equivalent weight and low cost of sulfur and its nontoxicity renders it also an attractive candidate battery component. Successful lithium/organosulfur battery cells are known. (See, De Jonghe et al., U.S. Pat. Nos. 4,833,048 and 4,917,974; and Visco et al., U.S. Pat. No. 5,162,175.)

Recent developments in ambient-temperature sulfur electrode technology may provide commercially viable primary and rechargeable lithium-sulfur batteries. Chu and colleagues are largely responsible for these developments which are described in U.S. Pat. Nos. 5,582,623 and 5,523,179 (issued to Chu). The patents disclose a sulfur-based positive electrode for a battery cell that has low equivalent weight and high cell voltage and consequently a high specific energy (greater than about 120 Wh/kg). The disclosed positive electrode addresses deficiencies in the prior art to provide a high capacity sulfur-based positive composite electrode suitable for use with metal (such as lithium) negative electrodes. These developments allow electrochemical utilization of elemental sulfur at levels of 50% and higher over multiple cycles. Because sulfur has a theoretical maximum capacity of 1675 mAh/g (assuming all sulfur atoms in an electrode are fully reduced during discharge), the utilization of sulfur in lithium-sulfur cells as described in the above Chu patents typically exceeds 800 milliamp-hours per gram (mAh/g) of sulfur.

Nevertheless, the challenge of providing improved batteries, and especially batteries having increased cycle life and long shelf-life, remains. In particular, the shelf-life of lithium-sulfur batteries is limited by the degradation of the lithium electrode surface during cell storage and the formation of thick and resistive surface passivating film comprising $Li_2S$. The passivating film may significantly increase the lithium electrode polarization at the early stages of the cell discharge.

To compensate for this loss of active anode material, extra lithium may be provided for the lithium electrode increasing the cost and weight of the battery. The use of additional metals also increases the burden of disposing of the battery as additional toxic materials must be processed. Mossy lithium formed during cell cycling can also present a fire hazard by creating fine particles of lithium metal that can ignite on contact with air.

Accordingly, methods for the prevention of capacity loss in battery cells with sulfur-containing cathodes and the prevention of degradation of the surface of a lithium electrode in such cells would be desirable.

SUMMARY OF THE INVENTION

The present invention provides oxidizer-treated lithium electrodes, battery cells containing such oxidizer-treated lithium electrodes, battery cell electrolytes containing oxidizing additives, and methods of treating lithium electrodes with oxidizing agents and battery cells containing such oxidizer-treated lithium electrodes. Battery cells containing an $SO_2$ oxidizing agent as an electrolyte additive in accordance with the present invention exhibit higher discharge capacities after cell storage over cells not containing $SO_2$. Pre-treating the lithium electrode with $SO_2$ gas prior to battery assembly prevented cell polarization. Moreover, the $SO_2$ treatment does not negatively impact sulfur utilization and improves the lithium's electrochemical function as the negative electrode in the battery cell.

One aspect of the invention provides a battery cell electrolyte. The battery cell electrolyte may be characterized as including: a) a main solvent of an electrolyte solvent mixture, having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups and b) an oxidizing agent additive comprising no more than about 49% by weight of the electrolyte solvent mixture. The oxidizing agent additive may be at least one of sulfur dioxide, nitrous oxide, carbon dioxide, a halogen, an interhalogen, an oxychloride and a sulfur monochloride where the halogen is selected from the group consisting of $Cl_2$, $Br_2$ and $I_2$ In specific embodiments, the oxychloride may be selected from the group consisting of $SO_2Cl_2$ and $SOCL_2$ and the interhalogen may be selected from the group consisting of iodine monochloride (ICl), iodine trichloride ($ICl_3$) and iodine monobromide $I_2Br_2$. Typically, the oxidizing agent additive has a stronger oxidizing ability than elemental S.

In preferred embodiments, the electrolyte may include a dioxolane co-solvent where the dioxolane co-solvent comprises less than about 20% by weight of the electrolyte solvent mixture and a second co-solvent having a donor number of at least about 13. The main solvent may be from the glyme family, in particular 1,2-dimethoxyethane (DME). The electrolyte may include an electrolyte salt where the electrolyte may be in a liquid state, a gel state or a solid state.

Another aspect of the present invention provides a battery cell. The battery cell may be characterized as including: a) a negative lithium electrode b) a positive electrode comprising an electrochemically active material and c) an electrolyte including a: i) a main solvent of an electrolyte solvent mixture, having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups and ii) an oxidizing agent additive. The oxidizing agent additive may be at least one of sulfur dioxide, nitrous oxide, carbon dioxide, halogens, interhalogens, oxychlorides and sulfur monochlorides. The electrochemically active material may comprise sulfur in the form of at least one of elemental sulfur, a metal sulfide, a metal polysulfide, an organosulfur material, and combinations thereof, wherein said metal is selected from the group consisting of alkali metals, alkaline earth metals, and mixtures of alkali and alkaline earth metals.

In specific embodiments, the battery cell electrolyte may include dioxolane as a co-solvent, comprising no more than 20% by weight of the electrolyte solvent mixture and a high donor number co-solvent having a donor number of at least about 13. In addition, the battery cell electrolyte may include an electrolyte salt. The electrolyte of the battery cell may be in a liquid state, a gel state, or a solid state.

Another aspect of the present invention provides a method of making a protected lithium electrode battery cell. The method may be characterized as including: a) treating a lithium material with an oxidizing agent to form a negative electrode having a protective film, b) forming a positive electrode comprising an electrochemically active material and c) combining said negative and positive electrodes with an electrolyte following the treating of said lithium material where the oxidizing agent is at least one of sulfur dioxide, nitrous oxide, carbon dioxide, halogens, interhalogens, oxychlorides and sulfur monochlorides.

Another aspect of the present invention provides a method of making a protected lithium electrode battery cell. The method may be characterized as including: a) forming a negative electrode comprising a lithium material, b) forming a positive electrode comprising an electrochemically active material and c) combining said negative and positive electrodes with an electrolyte containing an oxidizing agent additive wherein the oxidizing agent additive reacts with the lithium material of the negative electrode to form a protective film on the negative electrode's surface. In specific embodiments, the negative electrode may be a glassy coated lithium electrode where a crack in the glassy coated lithium electrode may be penetrated by the oxidizing agent additive and the crack may be filled with a reaction product between the oxidizing agent additive and the lithium material of the glassy coated lithium electrode.

These and other features of the invention will further described and exemplified in the drawings and detailed description below.

DETAILED DESCRIPTION OF PREFERRED EMBODIMENTS

Figure 1:
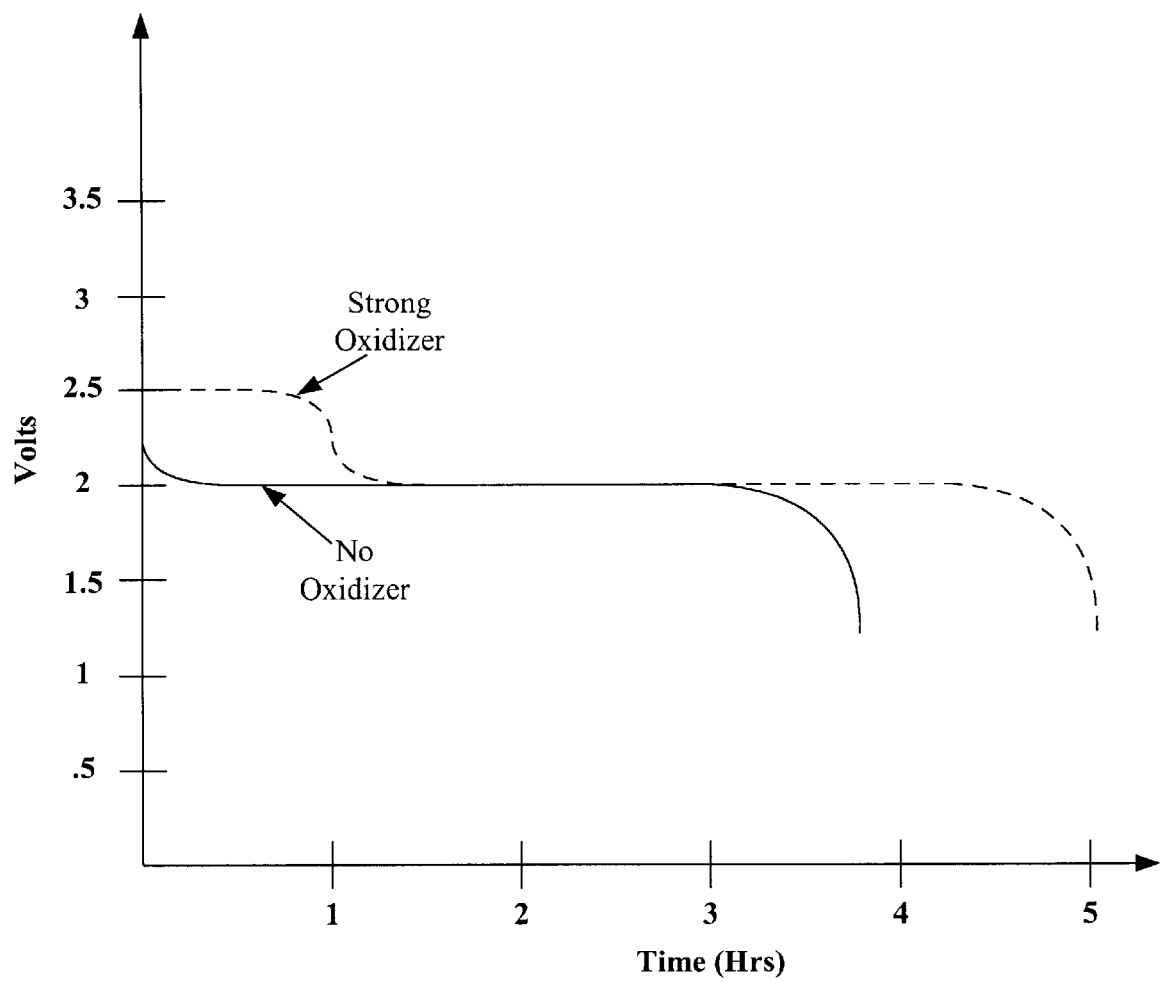
FIG. 1 depicts representative discharge characteristics for Li/S cells with and without an oxidizing agent additive.

Reference will now be made in detail to preferred embodiments of the invention. Examples of preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

INTRODUCTION

The present invention provides oxidizer-treated lithium electrodes, battery cells containing such oxidizer-treated lithium electrodes, battery cell electrolytes containing an oxidizing agent, and methods of treating lithium electrodes with an oxidizer and methods of constructing battery cells containing such oxidizer-treated lithium electrodes. Treating lithium with an oxidizing agent allows a solid passivating film with Li-ion conductivity to form on the surface of the lithium. When used in a battery cell, the passivating film may protect a Li electrode from reactions with other active components of the electrolyte. When the Li is not treated with an oxidizing agent, during cell storage, the reactions with other active components in the electrolyte may result in the formation of a thick and porous film on the lithium surface. The thick and porous film may result in cell rate capability loss and a significant increase in Li electrode polarization at the early stage of the cell discharge. Pretreatment of the Li electrode with the oxidizing agent or in-situ treatment of the Li electrode using an oxidizing additive in the electrolyte reduces the rate capability loss and polarization effects in a battery cell as compared to untreated Li electrodes in a similar battery cell. In addition, the oxidizing agent treatment does not negatively impact sulfur utilization and improves the lithium's electrochemical function as the negative electrode in the battery cell.

For example, experiments with Lithium-sulfur cells having S-loaded carbon cathodes and different electrolytes have shown that after storage for several days cell capacity significantly decreased. The capacity loss was observed for electrolyte formulations with a high solubility or a low solubility of lithium polysulfides (PS). Without wishing to be bound by any particular theory, the capacity loss may be caused by the dissolution of elemental sulfur in the electrolyte followed by reaction between sulfur and the lithium electrode surface. The product of the reaction of sulfur with the lithium surface ($Li_2S$) dissolves in the electrolyte to form lithium polysulfides ($Li_2S_x$). Thus, the corrosion rate of the Li electrode will be high as long as elemental sulfur is present in the cell. Further, the formation of a $Li_2S$ layer on the Li electrode surface may result in high electrode polarization when the cell is initially discharged.

The pre-treatment or in-situ treatment of the lithium electrode with the oxidizing agent decreases the corrosion and polarization effects. For example, when the lithium electrode is pre-treated with $SO_2$ gas, it is believed that a protective layer of the Li-ion conductor $Li_2S_2O_4$ is formed in the surface of the electrode. The $Li_2S_2O_4$ layer may prevent reaction of elemental sulfur with the surface of the electrode and hence decrease electrode corrosion during cell storage and polarization of the electrode during discharge.

In addition, the oxidizing agent may be advantageously used as additive in lithium battery cell electrolytes. For example, when the $SO_2$ is used in certain amounts as an additive in the electrolyte, preferably no more than about 49% by weight of the electrolyte solvent mixture, $SO_2$ can provide in situ protection of the lithium electrode without negatively impacting sulfur utilization while improving cell discharge characteristics after storage under open circuit voltage (OCV) conditions. As a result of presence of $SO_2$ electrolyte additive, the highest state of sulfur oxidation due to the oxidation of polysulfides to sulfur is maintained.

The capacity of the battery cell may be increased employing an oxidizing agent additive in the electrolyte solution. For battery cells containing an oxidizing agent additive, the cathode has the value of the potential between the potential of the cathode, including the sulfur electrode, and the potential of the oxidizing additive which is usually more positive than the potential of lithium. When the cells starts to discharge, the oxidizer is reduced first which may increase the capacity of the battery. The additional delivered capacity depends on the amount of the oxidizing agent dissolved in the electrolyte. Further, oxidizing agents may alter the chemistry in a Li/S in a number of other ways which may also be beneficial to the battery cell performance: 1) via the formation of charge-transfer complexes between additives and organic solvents or polysulfides in the cell, 2) via the electrocatalysis of sulfur and polysulfides and 3) via a change in the morphology of the $Li_2S$ precipitate due to the formation of discharge products of the oxidizing additive.

FIG. 1 are example plots of discharge curves after storage under OCV conditions, for Li/S battery cells with and without oxidizing agent additives. The dashed line is representative of a typical discharge curve for a Li/S battery cell with the oxidizing agent additive and the solid line is representative of a typical discharge curve for a Li/S battery cell without the oxidizing agent additive. Other than the electrolyte oxidizing agent additive, both cells utilize a similar electrolyte formulation. Details of the electrolyte formulation are described in more detail in the following section on electrolytes.

The larger capacity of the battery cell with the oxidizing agent additive during initial discharge of the battery is due to the reduction of the oxidizing agent. When the oxidizing agent additive is reduced completely, the battery cells with and without the oxidizing agent additive exhibit a similar capacity. However, as a result of the corrosion protection afforded by the oxidizing agent additive to the Lithium electrode, the battery cell with the oxidizing agent exhibits a larger rate capability over time than the battery cell without the oxidizing agent. The benefits of oxidizing agent electrolyte additives may be useful for many types of battery systems and are not limited to Li/S battery cells described herein.

The use of oxidizing agent electrolyte additives may also be advantageous when implemented in a battery cell with a lithium electrode protected with a thin Li-ion glassy conductor. The oxidizing agent tends to penetrate into the cracks and other imperfections of the glassy layer. Then, the oxidizing agent reacts with the Li electrode protecting its surface from reacting with sulfur or polysulfides. In addition, the reaction product of lithium and the oxidizing agent formed on the surface of the lithium electrode and within the cracks of the glassy layer may prevent further cracking of the glassy layer under gravitational and thermal stresses. Thus, the invented electrolyte may provide a mechanism for glassy layer healing in a battery cell employing a lithium electrode coated with a thin Li-ion glassy conductor.

Details and specific embodiments of the present invention in regards to oxidizer-treated lithium electrodes, battery cells containing such oxidizer-treated lithium electrodes, battery cell electrolytes containing an oxidizing agent additive, methods of treating lithium electrodes with oxidizer and methods of assembling battery cells containing such oxidizer-treated lithium electrodes are described in the following sections.

BATTERY DESIGN

Suitable batteries may be constructed according to the known art for assembling cell components and cells as desired, and any of the known configurations may be fabricated utilizing the invention. The exact structures will depend primarily upon the intended use of the battery unit. Examples include thin film with porous separator, thin film polymeric laminate, jelly roll (i.e., spirally wound), prismatic, coin cell, etc.

The negative electrode is spaced from the positive sulfur electrode, and both electrodes may be in material contact with an electrolyte separator. Current collectors contact both the positive and negative electrodes in a conventional manner and permit an electrical current to be drawn by an external circuit. In a typical cell, all of the components will be enclosed in an appropriate casing, for example, plastic, with only the current collectors extending beyond the casing. Thereby, reactive elements, such as sodium or lithium in the negative electrode, as well as other cell elements are protected.

Conventional cell designs are known in the art, which may be consulted for details. Examples of sulfur cells employing various design configurations are set forth in the following references which are incorporated herein by reference for all purposes: (1) R. D. Rauh, F. S. Shuker, J. M. Marston and S. B. Brummer, J. Inorg. Nuc. Chem., "Formation of Lithium Polysulfides in Aprotic Media", 39, 1761 (1977); (2) R. D. Rauh, K. M. Abraham, G. F. Pearson, J. K. Suprenant and S. B. Brummer, "A Lithium/Dissolved Sulfur Battery with an Organic Electrolyte," J. Electrochem. Soc., 126, 523 (1979); (3) H. Yamin, A. Gorenshtein, J. Penciner, Y. Sterberg, and E. Peled, "Lithium Sulfur Battery," J. Electrochem. Soc., 135, 1045 (1988); (4) H. Yamin and E. Peled, "Electrochemistry of a Nonaqueous Lithium/Sulfur Cell," J. Power Sources, 9, 281 (1983); and (5) E. Peled, Y. Sterberg, A. Gorenshtein, and Y. Lavi, "Lithium-Sulfur Battery: Evaluation of Dioxolane-Based Electrolyte," J. Electrochem. Soc., 136, 1621 (1989).

Figure 2:
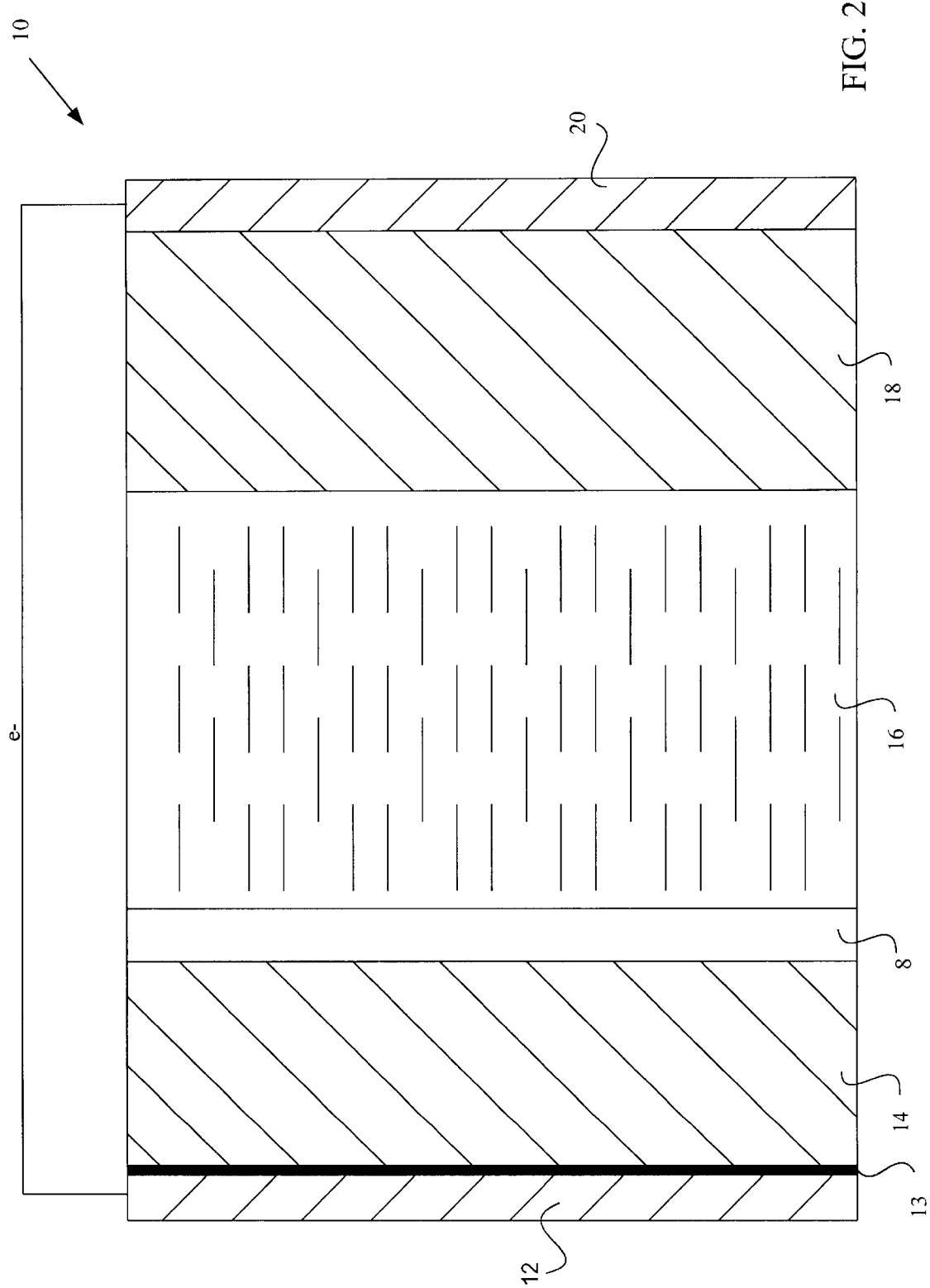
FIG. 2 is a block diagram of lithium/liquid electrolyte/sulfur cell of this invention.

Referring now to FIG. 2, a cell 10 in accordance with a preferred embodiment of the present invention is shown. Cell 10 includes a negative current collector 12, which is formed of an electronically conductive material. The current collector serves to conduct electrons between a cell terminal (not shown) and a negative electrode 14 (such as lithium) to which current collector 12 is affixed. If negative electrode 14 is made from lithium or other similarly reactive material, it will preferably include a protective layer 8 formed opposite current collector 12. Either negative electrode 14 or protective layer 8 (if present) contacts a liquid electrolyte in an electrolyte region 16.

Region 16 may be delineated by the boundaries of a separator, which prevents electronic contact between the positive and negative electrodes. A positive electrode 18 abuts the side of separator layer 16 opposite negative electrode 14. As electrolyte region 16 is an electronic insulator and ionic conductor, positive electrode 18 is ionically coupled to but electronically insulated from negative electrode 14. Finally, the side of positive electrode 18 opposite electrolyte region 16 is affixed to a positive current collector 20. Current collector 20 provides an electronic connection between a positive cell terminal (not shown) and positive electrode 18.

Current collectors 12 and 20, which provide current connections to the positive and negative electrodes, should resist degradation in the electrochemical environment of the cell and should remain substantially unchanged during discharge and charge. In one embodiment, the current collectors are sheets of conductive material such as aluminum, copper, or stainless steel. The positive electrode may be attached to the current collector by directly forming on the current collector or by pressing a pre-formed electrode onto the current collector. Positive electrode mixtures formed directly onto current collectors preferably have good adhesion. Positive electrode films can also be cast or pressed onto expanded metal sheets. Alternately, metal leads can be attached to the positive electrode by crimp-sealing, metal spraying, sputtering or other techniques known to those skilled in the art. The sulfur-based positive electrode can be pressed together with the electrolyte separator sandwiched between the electrodes. In order to provide good electrical conductivity between the positive electrode and a metal container, an electronically conductive matrix of, for example, carbon or aluminum powders or fibers or metal mesh may be used.

In the case where sulfur is provided entirely as a dissolved species in the electrolyte, positive electrode 18 may primarily include an electronic conductor such as a carbon fiber matrix together with a binder or other additives. In the case where sulfur is provided in both the solid and liquid (dissolved) phases, positive electrode 18 will include some amount of active sulfur in conjunction with the electronic conductor and possibly additives.

The separator may occupy all or some part of electrolyte compartment 16. Preferably, it will be a highly porous/permeable material such as a felt, paper, or microporous plastic film. It should also resist attack by the electrolyte and other cell components under the potentials experienced within the cell. Examples of suitable separators include glass, plastic, ceramic, and porous membranes thereof among other separators known to those in the art. In one specific embodiment, the separator is Celgard 2300 or Celgard 2400 available from Hoechst Celanese of Dallas, Tex.

The separator may also be of the type sometimes referred to as a "polymer" separator membrane having a porous or microporous network for entraining liquid electrolyte. Such separators are described in U.S. Pat. No. 3,351,495 assigned to W. R. Grace & Co. and U.S. Pat. Nos. 5,460,904, 5,540,741, and 5,607,485 all assigned to Bellcore, for example. These patents are incorporated herein by reference for all purposes.

In a preferred embodiment, the metal-sulfur cell has relatively thick positive and negative electrodes. Such thick format cells are particularly beneficial for use as primary cells, although they are appropriate in some secondary cells as well. The additional material provided in the electrodes provides extra capacity for long life. In a specific example, the positive electrode of a primary cell has an average thickness of at least about 40 micrometers and the positive electrode of a secondary cell has an average thickness of at most about 8micrometers. These thickness' apply to electrodes in which all sulfur is provided by the catholyte and those in which at least some sulfur is provided in the solid phase and localized at the electrode. Generally such thickness' represent a bare minimum and are appropriate with very high concentration catholytes.(e.g., 15 molar sulfur or possibly even 25 molar sulfur). In more typical embodiments, the positive electrode thickness will range between about 40 and 130 micrometers for primary cells and between about 8 and 30 micrometers for secondary cells. Note that it may be feasible and appropriate to provide sulfur as a suspension (e.g., a colloid) in the catholyte. Note also that it is generally desirable that the positive electrode have a relatively high porosity, possibly as high as 95% or more. Generally, higher porosity electrodes allow fabrication of cells with higher laminate energy densities because less electronic conductor is required. Of course, an electrode's porosity, capacity, and thickness are linked so that setting two of these parameters fixes the other.

ELECTROCHEMICAL AND CHEMICAL MECHANISMS OF LITHIUM-SULFUR LIQUID ELECTROLYTE BATTERIES

Referring again to FIG. 2, lithium-sulfur cell 10 will be described with relevant reaction mechanisms explained. During normal charging, the electrons are extracted from positive electrode 18 and transported over electrical connection 38 to negative electrode 14. The removal of electrons at positive electrode 18 oxidizes the species present in the electrode. In this reaction, lithium ions are liberated from lithium sulfide and/or lithium polysulfide species present in the positive electrode. The species remaining in the positive electrode will have the general formula $Li_2S_x$, where x has a value of 1 or greater. Over time the charge reaction produces polysulfide species having longer and longer sulfur chains. It is known for example that in a normal charge reaction, the value of x in some polysulfides may be 12 or greater. In addition, some of the polysulfides will be further oxidized to elemental sulfur.

At the negative electrode, lithium ions present in the electrolyte 16 are transported through protective layer 8 and reduced to lithium metal as electrons are moved through electrical conduit 38.

The above electrode reactions proceed in the reverse direction during discharge. That is, the electrochemical reduction of active sulfur pulls electrons to positive electrode 18 through current collector 20 and from line 38. This reduces elemental sulfur, if present, to form various lithium species including lithium polysulfides and lithium sulfide. It also reduces the highly oxidized polysulfides to less oxidized polysulfides and lithium sulfide. Simultaneously, lithium ions are provided from negative electrode 14 through the electrolyte. The lithium ions are generated in conjunction with the flow of electrons from negative electrode 14 to line 38 (via current collector 12).

Generally, the higher molecular weight polysulfides (those with more sulfur atoms) are more highly soluble than their lower molecular weight counterparts. During discharge, these higher molecular weight species go into solution in the electrolyte and migrate throughout the cell. Some of the dissolved species move to the negative lithium metal electrode where they may be chemically reduced to form less-soluble lower molecular weight compounds such as lithium sulfide. Some of this lithium sulfide may form as a layer on the lithium metal electrode. The lithium sulfide layer may affect the batteries discharge characteristics such as polarization. Further, excess lithium sulfide may precipitate out of solution where it serves no beneficial use in the cell. In fact, the precipitated lithium sulfide (and/or less-soluble lower molecular weight polysulfides) represents lithium and sulfur that is no longer available for immediate participation in electrochemical reactions. Thus, precipitation of these compounds reduces the battery's capacity.

Precipitated sulfide or polysulfide may also form because the local solution concentration of these species exceeds their solubility limits. This occurs when the species are generated faster than they can diffuse away, a condition that exists when the local current density is too great in comparison with the mass transport rate. That is, the solution phase concentration gradient must support a mass flux that is sufficiently high to remove reaction products before they accumulate to their solubility limit. The present invention addresses this problem in at least two ways. First, it provides electrolyte solvents in which the discharge species are highly soluble and highly mobile thereby reducing the likelihood of precipitation. Second, it provides a cathode structure in which the mass flux is sufficiently fast that the local concentration of soluble species does not exceed the solubility limits.

Assuming that some precipitation will occur so that solid phase sulfur, sulfide, and/or polysulfide exist in the cell, it is important that the cell be designed to make these precipitated electroactive species available to electronic and ionic charge carriers. This allows high utilization of the active sulfur in the cell. To this end, the electronic conductor in the positive electrode should form an interconnected matrix so that there is always a clear current path from the positive current collector to any position in the electronic conductor. The interconnected matrix of the electronic conductor should also be sufficiently "open" that there is room for precipitated electroactive species to deposit on the matrix.

Finally, any binder employed in the positive electrode should not prevent contact between the electronic conductor and the electroactive species. For example, the binder should not provide so much wetting that precipitated sulfur particles and/or the current collector are completely wetted and therefore unable to exchange electrons.

LIQUID ELECTROLYTES

It has now been discovered that the performance of lithium-sulfur batteries can be improved by employing electrolyte compositions designed to solubilize lithium sulfide and relatively low molecular weight polysulfides. The new electrolytes of this invention contain oxidizing agent additives that provide an in-situ mechanism for forming a protective coating on the metal electrode when the additive is used in a battery cell. In general, the electrolyte compositions of this invention include one or more solvents that strongly coordinate lithium. These solvents are "ionophores" for lithium ions. Exemplary ionophores are podands, coronands, and cryptands as described in chapter 10 of the treatise "Lithium Chemistry, A Theoretical and Experimental Overview," Anne-Marie Sapse and Paul Von Rague Schleyer, Eds. John Wiley & Sons, New York (1995) which is incorporated herein by reference for all purposes. Chapter 10 was written by Bartsch et al. Podands are acyclic multidentate ligands. Common examples are glymes and polyethylene glycols. Coronands are monocyclic multidentate ligands. Common examples are crown ethers and substituted crown ethers. Cryptands are multicyclic multidentate ligands.

In a preferred embodiment, the electrolyte solvents of this invention include one or more compounds having an ethanediether linkage. They have the general formula $R_1(CH_2CH_2O)_nR2$, where n ranges between 1 and 10 and R1 and R2 are different or identical alkyl or alkoxy groups (including substituted alkyl or alkoxy groups). Alternatively, R1 and R2 may together form a closed ring to form a crown ether for example. Examples of linear solvents include the glymes $(CH_3O(CH_2CH_2O)_nCH_3)$ including monoglyme, diglyme, triglyme and tetraglyme and related oxides of the formula $(CH_2CH_2O)_n(CH_2O)_p$, where p ranges from about 1 to 50. Such ethoxy repeating unit compounds serve as lithium ion coordinating solvents. In a preferred embodiment, the main solvent is a glyme having a value of n ranging between 1 and 6. In an especially preferred embodiment, the glyme is 1,2 -dimethoxyethane ($CH_3O(CH_2CH_2O)CH_3$). In another embodiment, the main solvent is a linear polyether.

Oxidizing agents, which may be added to the electrolyte solvents of this invention include soluble active additives. At least one of the following compounds is added to the electrolyte solvents including, sulfur dioxide ($SO_2$), nitrous oxide ($N_2O$), carbon dioxide ($CO_2$), halogens, interhalogens, oxychlorides, sulfur monochlorides, vinyl carbonate and halogenated carbonates. Halogens ($Cl_2$, $Br_2$ and $I_2$) as well as oxychlorides ($SO_2Cl_2$ and $SOCl_2$), and sulfur monochlorides $S_2Cl_2$ have stronger oxidizing ability than elemental S. The potentials of these compounds versus Li exceed 3.5 V. The Li-$I_2$ couple OCV is about 2.8V . In a battery cell fabrication, it may be more practical to use interhalogens (e.g. iodine monochloride (ICl), iodine trichloride (ICl$_3$) and iodine monobromide I$_2$Br$_2$) instead of halogens because interhalogens are liquids or solids that can easily dissociate in the electrolyte and form halogens. Also, $SO_2$ and $N_2O$ are stronger oxidizers than the polysulfides or the elemental S. For example, the Li-$SO_2$ couple OCV is about 3.0 V.

Strong oxidizing agents in the electrolyte can serve two main functions when incorporated into a Li/S battery cell. First, because of their strong oxidizing ability the oxidizers immediately react with Li forming a solid passivating film with Li-ion conductivity. If the material of the passivating film has a low solubility in the electrolyte solution, the Li electrode is protected from reaction with other active components of the electrolyte. For example, the Li electrode may be protected from reactions with dissolved elemental sulfur and polysulfides. In the case of $SO_2$, a protective layer of the Li-ion conductor $Li_2S_2O_4$ is formed. In the case of additives of thionylchloride and iodine trichloride, a polycrystalline layer of LiCL with a relatively high ionic conductivity is formed. Second, during cell storage under OCV conditions, the additives may maintain the highest possible state of sulfur oxidation because of oxidation of the polysulfides to the elemental sulfur. Further, as described above, the addition of oxidizing agents in the electrolyte may add additional battery capacity because the additives are stronger oxidizers than the polysulfides.

The batteries of this invention can operate at room temperature. However, the present invention also pertains to systems operating at temperatures slightly outside of the ambient. Obviously, the choice of operating temperature ranges can influence the preferred electrolyte for the batteries of this invention. For example, at relatively low operating temperatures, lower molecular weight electrolytes will be preferred, so the value of "n" in the above-describe ethanediether compounds will be in the lower end of the 1–10 range. At higher temperatures, the opposite is true.

While the electrolyte solvents described above are a main component of the electrolytes of this invention, one or more cosolvents may be provided with them. If such cosolvents are employed, they are preferably chosen to solubilize lithium cations or sulfide/polysulfide anions. In certain preferred embodiments, crown ethers and/or cryptands are provided as cosolvents. In other preferred embodiments, donor or acceptor cosolvents may be employed. In a particularly preferred embodiment, the cosolvent is dioxolane. Preferred dioxolane-containing electrolytes are further described in U.S. patent application Ser. No. 09/245,167, titled DIOXOLANE AS A COSOLVENT IN Li/Li2Sx BATTERIES, filed on Feb. 5, 1999, and having Nimon et al. as inventors. That document is incorporated herein by reference for all purposes.

Crown ethers also can be used as co-solvents. Crown ethers are macrocyclic polyethers generally having repeating ethoxy and/or propoxy groups. Crown ethers with 3 to 20 oxygen atoms have been synthesized. They are typically made up of linked ethoxy units $(CH_2CH_2O)n$ as shown below. A general abbreviation used is n-C-m where n is the ring size and m is the number of oxygen atoms in the ring.

Commercially available crown ethers which have application in this invention include 12-crown-4, 15-crown-5, 18-crown-6, and modified crowns such as dibenzo-18-crown-6. Crown ethers are known to be complexing agents which solubilize alkali metal cations in nonpolar solvents. 12-crown-4 is known to be specific for the lithium cation.

In substituted crown ethers, one or more of the hydrogen atoms are replaced with a hydrocarbon group that may be linear, branched, or aromatic. These hydrocarbon groups may, in turn, be substituted with halo (F, Cl, Br, I), nitrile (CN), nitro ($NO_2$), hydroxy (OH), and other common substituent groups. Examples are presented in chapter 10 of the above referenced "Lithium Chemistry" treatise. Specific examples include dibenzo-14-crown-4, tetramethyl-12-crown-4, benzo-15-crown-5. Crown ethers may also be substituted with podand groups such as ($-COCH_2CH_2OCH_3$) to form podano-coronands or "lariat ethers."

In an alternative embodiment, the main solvent is a cryptand. Cryptands are also known to strongly complex with alkali metal cations. Structurally, they are similar to crown ethers but possess an additional ($-XCH_2CH_2$) bridge to create an additional ring. X may be an oxygen, nitrogen, or sulfur atom. Often X is nitrogen and the corresponding cryptands are described as containing two nitrogen atoms linked by three $(CH_2CH_2O)_n$ bridges. These compounds are commonly identified by the number of oxygen atoms in each of the three bridges. Thus, a cryptand in which two of the bridges have n=2 (two oxygen atoms) and a third bridge having n=1 (one oxygen atom) is identified as [2.2.1]-cryptand.

One example of a general class of cosolvents is the donor solvents, which tend to solubilize cations and acceptor solvents which tend to solubilize anions. Donor solvents are characterized by high donor numbers DN. A desirable property of both donor and acceptor cosolvents used in this invention is a high dielectric constant. Such solvents generally promote dissociation of an ionic solute or a contact ion-pair.

Generally, donor solvents are those solvents which can be characterize as Lewis bases (they may be aprotic solvents). Generally, these solvents are good at solvating cations such as lithium ions. Donor solvents promote the ionization of covalent compounds to form intimate (or contact) ion-pairs. The concept of a solvent donor number is further explained and exemplified in "Experimental Electrochemistry, for Chemists," by Sawyer and Roberts, Jr., John Wiley & Sons, New York (1995). That reference is incorporated herein by reference for all purposes.

Suitable donor cosolvents include hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate, N,N,N',N'-tetraethylsulfamide, tetramethylenediamine, tetramethylpropylenediamine, and pentamethyldiethylenetriamine. These assist in solvation of lithium ions.

Suitable acceptor solvents assist in solvation of the sulfide and polysulfide anions. Acceptor solvents are those solvents which can be characterized as Lewis acids (they may be protic or aprotic solvents) and promote solvation of anions. Examples include alcohols such as methanol, glycols such as ethylene glycol, and polyglycols such as polyethylene glycol, as well as nitromethane, trifluoroacetic acid, trifluoromethanesulfonic acid, sulfur dioxide, and boron trifluoride.

It should be understood that the electrolyte solvents of this invention may also include other cosolvents which do not necessary fall into the donor solvent and acceptor solvent classes. Examples of such additional cosolvents include sulfolane, dimethyl sulfone, dialkyl carbonates, tetrahydrofuran (THF), dioxolane, propylene carbonate (PC), ethylene carbonate (EC), dimethyl carbonate (DMC), butyrolactone, N-methylpyrrolidinone, dimethoxyethane (DME or glyme), and combinations of such liquids.

In general, the liquid electrolyte solvents of this invention include about 50 to 100% by weight of the main solvent (excluding salts) which is usually one or more podand such as the above-described ethanediether compounds and include up to 49% by weight of the oxidizing additive. The balance will be one or more of the cosolvents listed above. More preferably, the electrolyte solvents include about 50 to 100% by weight main solvent, and most preferably between about 70 and 90% by weight main solvent. As noted, the main solvent is one or more of the lithium coordinating ionophores described above (podands such as glymes, coronands such as crown ethers, or cryptands). Aside from the main solvent, the electrolyte solvent may include one or more cosolvents (described above) which make up the balance. In a particularly preferred embodiment, the electrolyte solvent includes DME as the main solvent and dioxolane as the cosolvent, with the dioxolane making up between about 5 and 15% by weight of the mixture.

Exemplary but optional electrolyte salts for the battery cells incorporating the electrolyte solvents of this invention include, for example, lithium trifluoromethanesulfonimide ($LIN(CF_3SO_2)_2$), lithium triflate ($LiCF_3SO_3$), lithium perchlorate ($LiClO_4$), $LiPF_6$, $LiBF_4$, $LiAsF_6$, $LiN(C_2F_5SO_2)_2$, as well as, corresponding salts depending on the choice of metal for the negative electrode, for example, the corresponding sodium salts. As indicated above, the electrolyte salt is optional for the battery cells of this invention, in that upon discharge of the battery, the metal sulfides or polysulfides formed can act as electrolyte salts, for example, $Mx/zS$ wherein $x=0$ to 2 and z is the valence of the metal.

Regardless of whether the sulfur is present in a solid phase, the cells of this invention preferably operate with their electrolytes at a concentration of between about 3 and 30molar sulfur, more preferably between about 5 and 25 molar sulfur, and most preferably between about 10 and 20 molar sulfur. The sulfur used in this measure is the sulfur atoms in electroactive species. Thus, for example, one molar $Li_2S$ corresponds to one molar sulfur, whereas one molar $Li_2S_5$ corresponds to five molar sulfur, and one molar $S_8$ corresponds to eight molar sulfur. Note that in some cases at least some of the sulfur may exist as suspended particles within the catholyte.

It should be understood that some systems employing liquid electrolytes are commonly referred to as having "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. As mentioned above, such separators are described in U.S. Pat. No. 3,351,495 assigned to W. R. Grace & Co. and U.S. Pat. Nos. 5,460,904, 5,540,741, and 5,607,485 all assigned to Bellcore, for example.

The battery cells of this invention may also include a gel-state or a solid-state electrolyte. An exemplary solid-state electrolyte separator is a ceramic or glass electrolyte separator which contains essentially no liquid. Specific examples of solid-state ceramic electrolyte separators include beta alumina-type materials such as sodium beta alumina, Nasicon™ or Lisicon™ glass or ceramic. Polymeric electrolytes, porous membranes, or combinations thereof are exemplary of a type of electrolyte separator to which an aprotic organic plasticizer liquid can be added according to this invention for the formation of a solid-state electrolyte separator containing less than 20% liquid. Suitable polymeric electrolytes include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide. In addition, the electrolyte separator could contain less than 20% by weight of a dioxolane-containing liquid electrolyte, such as described above.

In the gel-state, the electrolyte separator contains at least 20% by weight of an organic liquid (see the above listed dioxolane-containing liquid electrolyte compositions for examples), with the liquid being immobilized by the inclusion of a gelling agent. Many gelling agents such as polyacrylonitrile, PVDF, or PEO can be used.

In addition, oxidizing electrolyte additives in accordance with the present invention may be used to supplement the protection afforded to glass-coated lithium electrodes, such as described in commonly-assigned co-pending U.S. patent application Ser. No. 09/431,190 entitled "Encapsulated Lithium Alloy Electrodes Having Barrier Layers", filed Nov. 1, 1999, the entire specification of which is incorporated herein by reference. In the case of lithium electrodes coated with a protective glass layer, the oxidizing electrolyte additives in accordance with the present invention may effectively heal cracks which form in the glass during cycling by penetrating the cracks and contacting the lithium to form a protective coating. An advantage of using the oxidizing additive, in the present invention, with the electrode covered with the glassy layer is that it reduces the quality requirements of the glassy layer and the complexity of quality control needed to manufacture the glassy electrode. In addition, the self-healing nature of the coating improves battery reliability as well.

NEGATIVE ELECTRODE

Most generally, the negative electrode can comprise any metal, any mixture of metals, glass, carbon or metal/carbon material capable of functioning as a negative electrode in combination with the sulfur-based composite positive electrode of this invention. Accordingly, negative electrodes comprising any of the alkali or alkaline earth metals or transition metals (the polyether electrolytes are known to transport divalent ions such as $Z_n^{++}$), for example, in combination with the positive electrodes and electrolytes of this invention are within the ambit of the invention, and particularly alloys containing lithium and/or sodium.

Stated another way, the negative electrodes employed in the batteries of this invention may include a metal (in elemental or alloy form) or an ion of that metal as used in, for example. a carbon intercalation electrode or a glass matrix electrode. As explained above, metal ions from this negative electrode combine with elemental sulfur or polysulfides to produce a sulfide and polysulfides of the metal during discharge of the battery. Some of the resulting metal sulfides and polysulfides may remain localized near the positive electrode. Some fraction of these discharge products, however, will dissolve in the solvent of the electrolyte and move freely through the liquid containing regions of the cell. As mentioned, some of these dissolved discharge products may actually precipitate from solution and become unavailable for further electrochemical reaction, thereby reducing the cell's capacity.

In one preferred embodiment, the materials for the negative electrodes include a metal such as lithium or sodium or an alloy of one of these with one or more additional alkali metals and/or alkaline earth metals. Preferred alloys include lithium aluminum alloys, lithium silicon alloys, lithium tin alloys, and sodium lead alloys (e.g., $Na_4Pb$). Other metallic electrodes may include alkaline earth electrodes such as magnesium and their alloys; transition metal electrodes such as aluminum, zinc, and lead and their alloys;

The surface of such metallic negative electrodes can be modified to include a protective layer on the electrolyte side. This protective layer should be conductive to lithium ions and help prevent the formation of lithium dendrites or "mossy" lithium on repeated cycling. As described above, it can be produced in situ of the battery cell by the action of oxidizing additives, including sulfur dioxide, nitrous oxide, carbon dioxide, halogens, interhalogens, oxychlorides and sulfur monochlorides. In addition, a protective coating may be added to an electrode by pretreating the electrode with gaseous sulfur dioxide, carbon dioxide or halogens or pretreating the electrode with liquid oxychlorides. For example, prior to battery assembly, the lithium electrode may be pretreated with gaseous sulfur dioxide to produce a film of $Li_2S_2O_4$ on the surface of the electrode. The film, as described above, provides the benefits such as improved discharge capacity after storage.

Examples of preferred protective layer formats and materials are described in the following U.S. patent applications, each of which is incorporated herein by reference for all purposes: U.S. patent application Ser. No. 09/086,665, filed May 29, 1998, titled PROTECTIVE COATINGS FOR NEGATIVE ELECTRODES, and naming Visco et al. as inventors; U.S. patent application Ser. No. 09/139,603, filed Aug. 25, 1998, titled PLATING METAL NEGATIVE ELECTRODES UNDER PROTECTIVE COATINGS, and naming Chu et al. as inventors; U.S. patent application Ser. No. 09/139,601, filed Aug. 25, 1998, titled METHOD FOR FORMING ENCAPSULATED LITHIUM ELECTRODES HAVING GLASS PROTECTIVE LAYERS, and naming Visco et al. as inventors; and U.S. patent application Ser. No. 09/431,190, filed Nov. 1, 1999, titled ENCAPSULATED LITHIUM ALLOY ELECTRODES HAVING BARRIER LAYERS, and naming Chu et al. as inventors.

In an alternative embodiment, the negative electrode may be an intercalation electrode such as a carbon-based lithium ion electrode. Such electrodes are available in commercial lithium ion batteries available from Sony Corporation of Japan. These materials are described by Jeffrey Dahn in Chapter 1 of "Lithium Batteries, New Materials, Developments and Perspectives," edited by G. Pistoia and published by Elsevier (1994), which reference is incorporated herein by reference. Generally, such electrodes have the formula $Li_yC_6$ (where y=0.3 to 2). For many of these materials, the fully charged electrode has the formula $LiC_6$. The intercalation electrode matrix may include graphite, petroleum coke, carbon inserted within highly disordered carbons, etc. The inserted carbon may also be doped with boron, phosphorus, or other appropriate dopant. In one example, the carbon may be prepared from low temperature pyrolysis (about 750° C. ) of carbon or carbon-silicon containing polymers such that the carbon product retains some hydrogen or silicon or both. (See, Sato et al., "A Mechanism of Lithium Storage in Disordered Carbons," Science, 264: 556 Apr. 22 1994), which discusses very good results with a preferred negative electrode of Li inserted within poly p-phenylene-based carbon).

Glass matrix negative electrodes such as $Li/Sn_2O_3$ and $Li/SiO_2$ may also be employed in the batteries of the present invention. These electrodes are similar to the above-described carbon-based intercalation electrodes in that lithium ions are inserted therein during charge and removed during discharge. Such glass matrix electrodes are described in various references including Tahara et al., European Patent Application No. 93111938.2 (1993), Idota et al. Canadian Patent Application, 21134053 (1994), and I. Courtney et al. Meeting Abstracts of the Electrochemical Society, Fall Meeting, San Antonio, Tx. Oct. 6–11, 1996 Vol. 96-2, Abstract #66, page 88, each of which is incorporated herein by reference for all purposes.

Figure 3A:
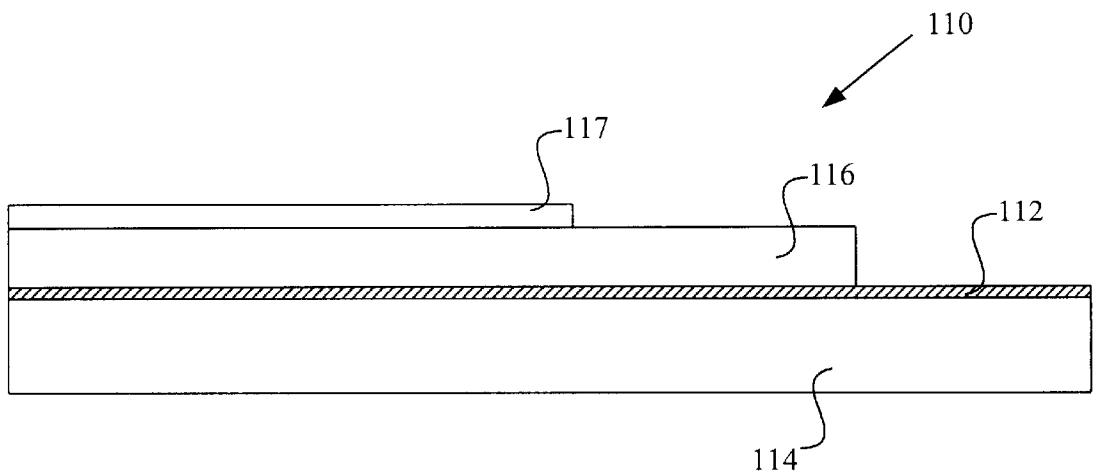
FIG. 3A is a schematic illustration of a pre-formed barrier laminate including a bonding layer on a polymer or glass barrier, which is in turn on a carrier.
Figure 3B:
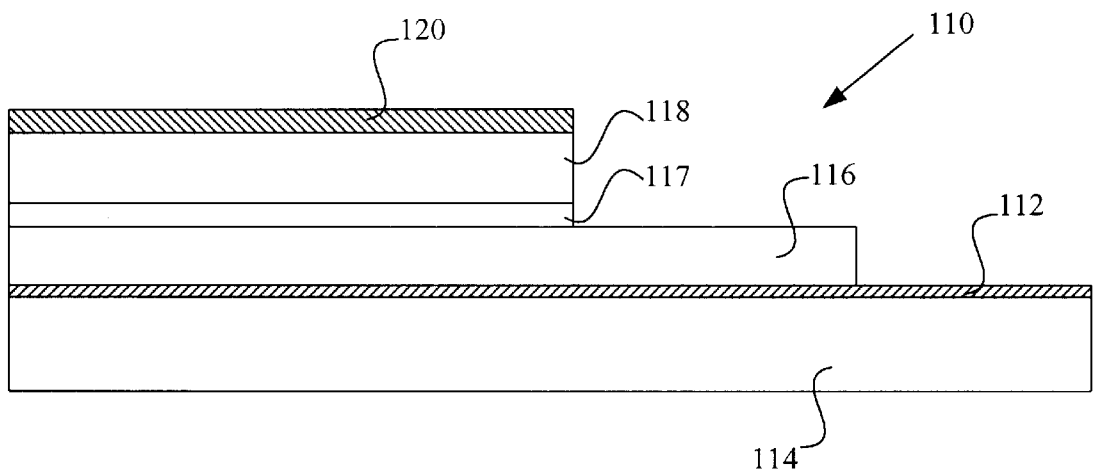
FIG. 3B is a schematic illustration of a lithium electrode being prepared according to an embodiment of the invention including forming a lithium layer on the bonding layer of the barrier layer laminate illustrated in FIG. 3A.

FIGS. 3A–B illustrate a fabrication process for a glassy coated lithium electrode which may be used with an oxidizing agent electrolyte additive of the present invention. Considering FIG. 1A first, a lithium electrode 110 is fabricated as a laminate in the following manner. Optionally, a thin layer of a release agent 112 is deposited on a web carrier 114 by evaporation for example. This web carrier and the release agent should have a very smooth surface. Deposition of the release agent is followed by deposition of a single ion conductor 116 onto release agent 112 by a suitable process such as sputtering, chemical vapor deposition, coating, extrusion/calendering, or spray coating. Layer 116 serves as a barrier layer in the completed electrode and is therefore preferably a single ion conductor which conducts ions of the active metal used in the electrode (e.g., lithium). Because barrier layer 116 is deposited on a very smooth surface, it too will be smooth and continuous.

As described above, any cracks that may form in the barrier layer 116 may be filled (e.g. "healed") by a reaction product of the active metal and an oxidizing agent additive in the electrolyte. For example, when a $SO_2$ oxidizing additive is part of the electrolyte solution of a battery cell with a glass coated lithium electrode, any cracks in the glass coat may allow $SO_2$ to react with the surface of the electrode. When the $SO_2$ reacts with Li in the electrode, $Li_2S_2O_4$ is formed essentially sealing the cracks in the glassy layer.

Next, after the barrier layer is formed, a bonding layer 117 is formed on barrier layer 116. This material should easily and strongly bond with the active metal. Preferably it is also substantially non-reactive with ambient agents such as moisture and other gases in air. Aluminum and aluminum alloys work well as bonding layer materials when lithium is the active metal.

Lithium 118 (or other active metal for the electrode) is deposited on bonding layer 117 by evaporation for example. Then, a current collector 120 (e.g., a copper layer of about 1000 angstroms to one micrometer thickness) is optionally formed on lithium layer 118 by a conventional process such as evaporation or sputtering. Finally, the barrier layer/ lithium layer/current collector laminate is separated from the carrier 114, with release layer 112 giving way. The bonding layer facilitates adherence of the lithium to the barrier layer to allow clean separation without damaging the barrier layer.

The resulting structure may be referred to as an "encapsulated electrode." Because the lithium is encapsulated within the barrier layer and the current collector, it may be transported, stored, and otherwise handled without the precautions normally required for a lithium metal electrode. Note that in some embodiments, a current collector is not employed. Rather, the layer of lithium is protected on one side and exposed on the other.

It is possible that the barrier layer laminate can be produced in a continuous fashion. A fresh layer, is formed on the web as it passes through each of a series of stations. The barrier layer laminate, including web, the release agent, the barrier layer, and the bonding layer, may be stored under ambient conditions.

Because the web carrier supports continuous fabrication of the electrode laminate through a series of deposition reactors, it should withstand high temperatures and wide pressure ranges. Examples of suitable web materials include plastics such as polyethylene terephthalate (PET), polypropylene, polyethylene, polyvinylchloride (PVC), polyolefins, and polyimides. The web carrier should have a thickness and tensile strength suitable for web handling at the line speeds dictated by the metal and glass or polymer deposition steps.

The release agent serves to release the subsequently formed electrode from the web carrier. The particular release layer chosen depends upon the types of web carrier and barrier layer employed. Suitable release agents are known in the art. In a specific embodiment, the release layer is a 50 angstrom copper film formed by evaporation or sputtering. The release agent should be as thin as possible while still retaining release properties, and easily dissolving in the target battery environments. In the case of a copper release, a thick copper release film could potentially block ionic transport to the barrier layer. Therefore a thin Cu layer is envisaged whereby, once in the battery environment, the thin copper layer is removed by corrosion and/or dissolution, exposing the barrier layer to the battery electrolyte.

The encapsulated electrode 110 resulting from this process includes a lithium metal layer 118 sandwiched between current collector 120 and barrier layer 116. Because the lithium layer is formed after the barrier layer (rather than having the barrier layer deposited on a potentially rough lithium surface as in conventional processes), the barrier layer is of high quality. That is, the barrier layer is generally gap-free and adherent when produced according to this invention. As mentioned, it may be difficult to directly deposit glass onto a lithium film due to the high degree of surface roughness of the lithium film relative to the sputter deposited glass film thickness (e.g., 300 to 1500 angstroms).

EXAMPLES

Various experiments were conducted to demonstrate the performance advantages provided by the various aspects of this invention. It should be understood that the experiments described in the following examples are representative only and in no way limit the scope of the present invention. The experiments are provided mainly to show the high level of performance that can be attained when following the guidelines presented herein.

Laboratory electrochemical cells of two types were constructed: with carbon cathodes (Li/C cells) and with elemental sulfur-loaded cathodes (Li/S cells).

Li/S CELLS

The Li/S cell contained a lithium anode (lithium foil 125 μm thick from AVESTOR, Montreal, Canada), a porous sulfur-loaded cathode, and an electrolyte solution containing a supporting salt, $LiN(SO_2CF_3)_2$—lithium bistrifluoromethane-sulfonilimide (LiTFSI), dissolved in a mixture of 1,2 dimethoxyethane (DME) with 1,3 dioxolane. The supporting salt was used at a concentration of 0.5 mole per liter of solution. The ratio of DME to dioxolane was 9:1 by weight. All electrolyte components were bought from Aldrich Chemical Company, Inc., Milwaukee, Wis.

The separator was a micro-porous polymeric layer having a nominal thickness of 25 microns (Hoechst Celanese, Celgard 2400). The separator was vacuum dried overnight prior to transfer into an argon-filled glove box.

The sulfur-loaded cathode was made by impregnating a slurry containing elemental sulfur into a carbon fiber paper (Lydall Technical papers, Rochester, N.Y.). The slurry composition was 50 wt % sulfur, 28 wt % carbon black, 20 wt % polyethylene oxide (MW=900K), and 2 wt % Brij35 dissolved in acetonitrile. The cathode was vacuum dried overnight prior to transfer into the glovebox for final cell assembly.

230 microliters of the electrolyte were placed on the porous cathode followed by placement of the microporous separator on the cathode. An additional 20 microliters of electrolyte were then placed on the separator layer. Once assembled, the cell was compressed at 2 psi.

Li/C CELLS

The Li/C cell contained a lithium anode (lithium foil 125 μm thick from AVESTOR, Montreal, Canada), a porous carbon cathode, and an electrolyte solution containing 0.5 mole per liter of LiTFSI and the lithium polysulfide $Li_2S_8$ completely dissolved in the mixture of DME and Dioxolane (9: 1).

The carbon porous cathode was made by air spraying a slurry containing 70% carbon black and 30% polyvinylidene flouride (Mw~250,000) into a carbon fiber paper (Lydall Technical papers, Rochester, N.Y.). The solvent was Dimethyl formamide. The slurry contained approximately 11% solids by weight. The cathode was vacuum dried overnight prior to transfer into the glovebox for cell assembly.

330 microliters of the electrolyte containing dissolved polysulfides were placed on the porous cathode followed by placement of the microporous separator on the cathode. An additional 20 microliters of electrolyte were then placed on the separator layer. Once assembled, the cell was compressed at 2 psi.

The cells were tested at 25° C. with a Series 4000 battery test system from Maccor Inc. of Tulsa, Okla.

Example 1

Figure 4:
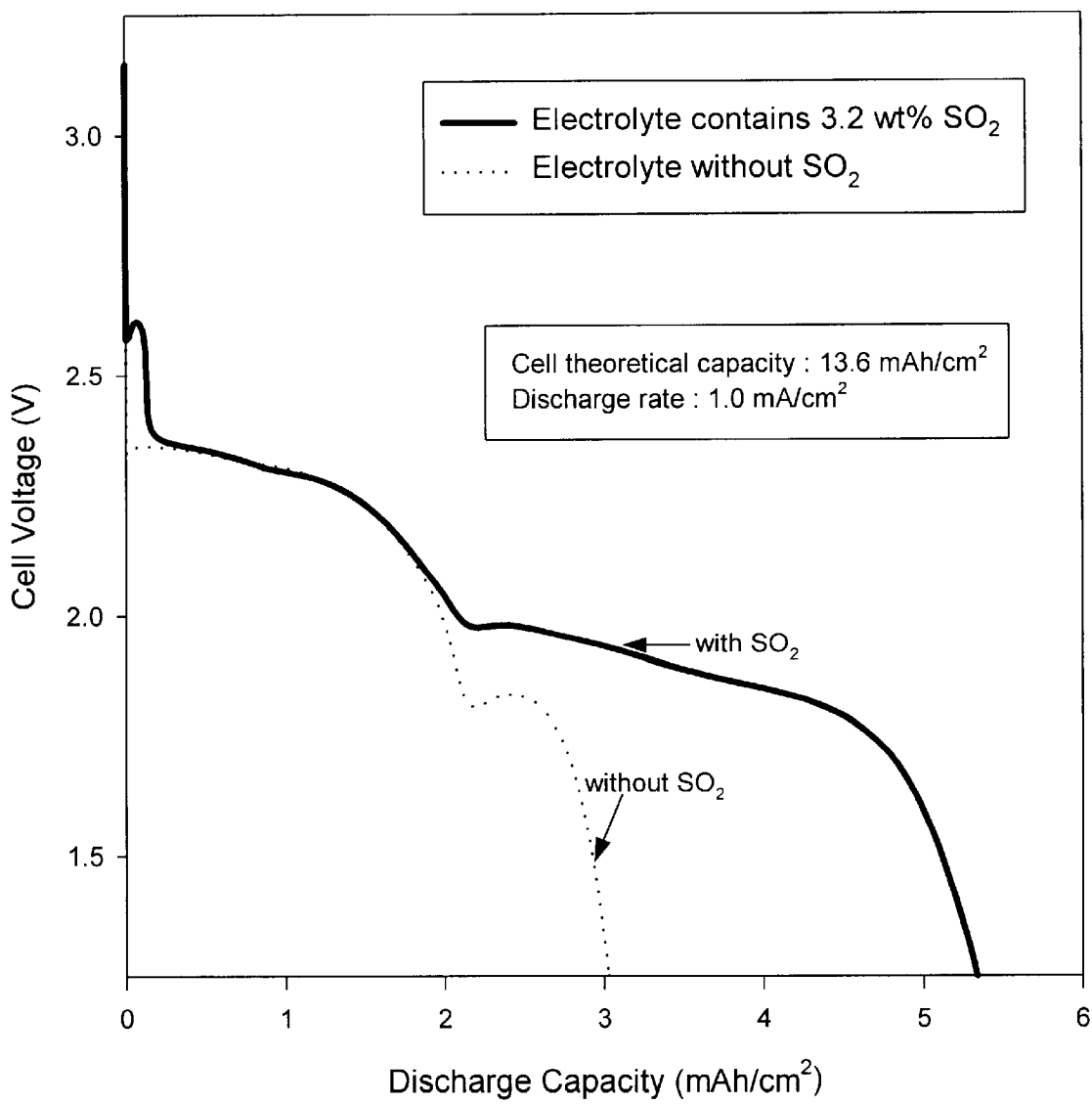
FIG. 4 illustrates effect of $SO_2$ electrolyte additive on discharge characteristics of Li/S cells after storage.

Li/S cells with S-loaded cathodes were discharged at 1.0 $mA/cm^2$ after 5 days of storage. A first cell contained an $SO_2$ additive in the electrolyte while a second cell did not contain the $SO_2$ additive. Besides the different electrolyte formulations, the first cell and the second cell were essentially similar. The $SO_2$ additive in the first cell comprised 3.2% of the electrolyte by weight. The second cell without the $SO_2$ additive in the electrolyte lost more than half of its initial capacity after 5 days of storage. The first cell having the electrolyte with 3.2% by weight of dissolved $SO_2$ exhibited a much larger capacity as compared to the second cell without the $SO_2$ additive (See FIG. 4).

Example 2

Figure 5:
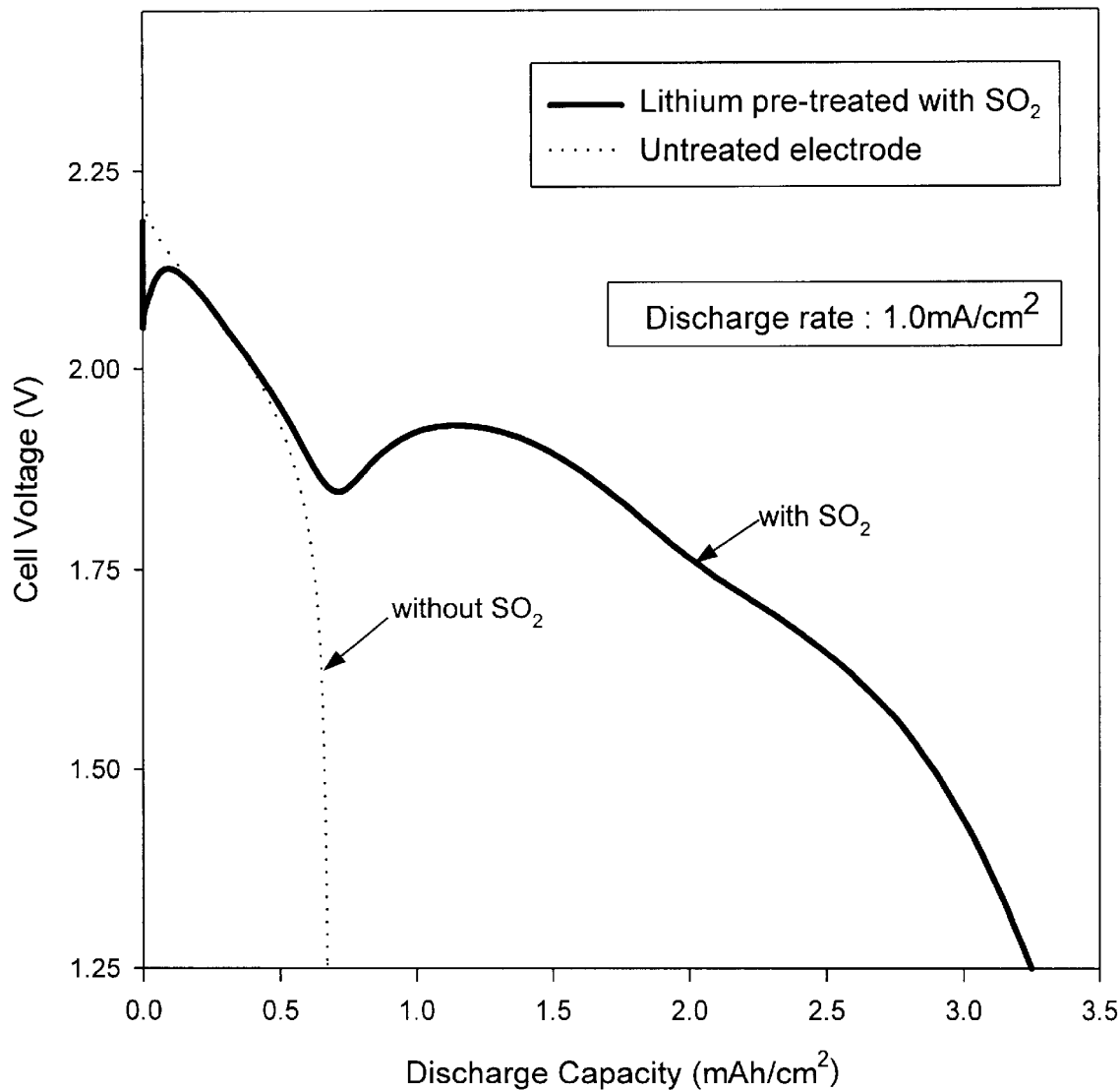
FIG. 5 illustrates effect of Li electrode pretreatment with $SO_2$ on discharge characteristics of Li/C cells containing dissolved polysulfides after cell storage.

Li/C cells with 12 M sulfur as $Li_2S_8$ dissolved in the mixture of DME and Dioxolane (9:1) were discharged at 1.0 $mA/cm^2$ after 4 days of storage. A lithium electrode in a first cell was pretreated with $SO_2$ gas prior to assembly of the first battery cell while a lithium electrode in a second cell was not pretreated with the $SO_2$ gas. Besides pre-treatment of the lithium electrode with $SO_2$ gas, the first cell and the second cell were essentially similar. The second cell with the untreated lithium electrode quickly polarized. The first cell having the lithium electrode pretreated with $SO_2$ gas exhibited a much larger capacity as compared to the second cell with the lithium electrode not treated with $SO_2$ gas (See FIG. 5).

Example 3

Figure 6:
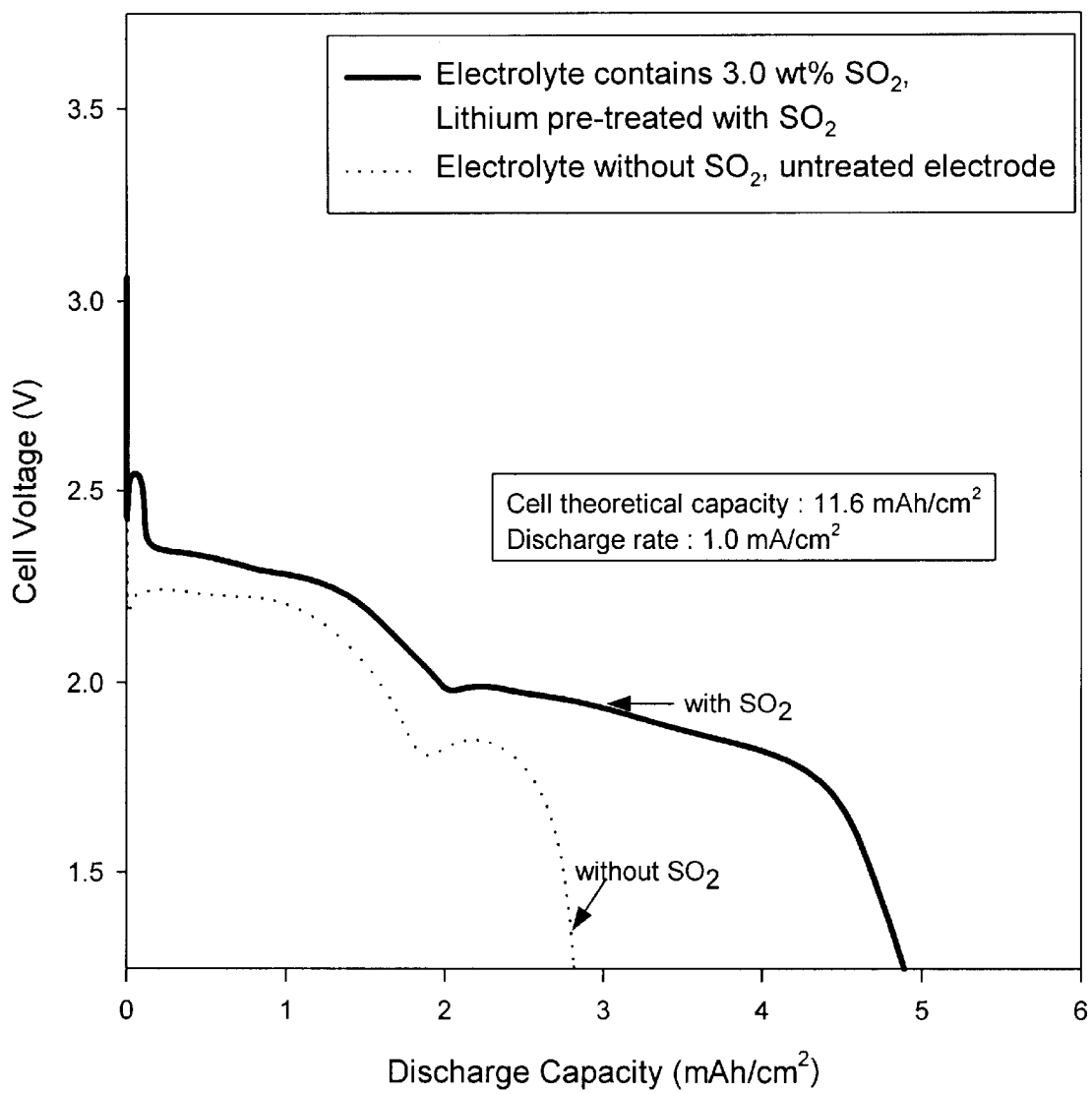
FIG. 6 illustrates effect of combination of Li electrode pretreatment with $SO_2$ and $SO_2$ electrolyte additive on discharge characteristics of Li/S cells after storage.

Li/S cells with S-loaded cathodes were discharged at 1.0 mA/cm after 5 days of storage. A lithium electrode in a first cell was pretreated with $SO_2$ gas prior to assembly of the first battery cell while a lithium electrode in a second cell was not pretreated with the $SO_2$ gas. In addition, a first cell contained an $SO_2$ additive in the electrolyte while a second cell did not contain the $SO_2$ additive. Besides the different electrolyte formulations and pre-treatment of the lithium electrode with $SO_2$ gas, the first cell and the second cell were essentially similar. The $SO_2$ additive in the first cell comprised 3.0% of the electrolyte by weight. The first cell having the lithium electrode pretreated with $SO_2$ gas and $SO_2$ electrolyte additive exhibited a much larger capacity as compared to the second cell with the lithium electrode not treated with $SO_2$ gas and without $SO_2$ electrolyte additive (See FIG. 6).

Example 4

Figure 7:
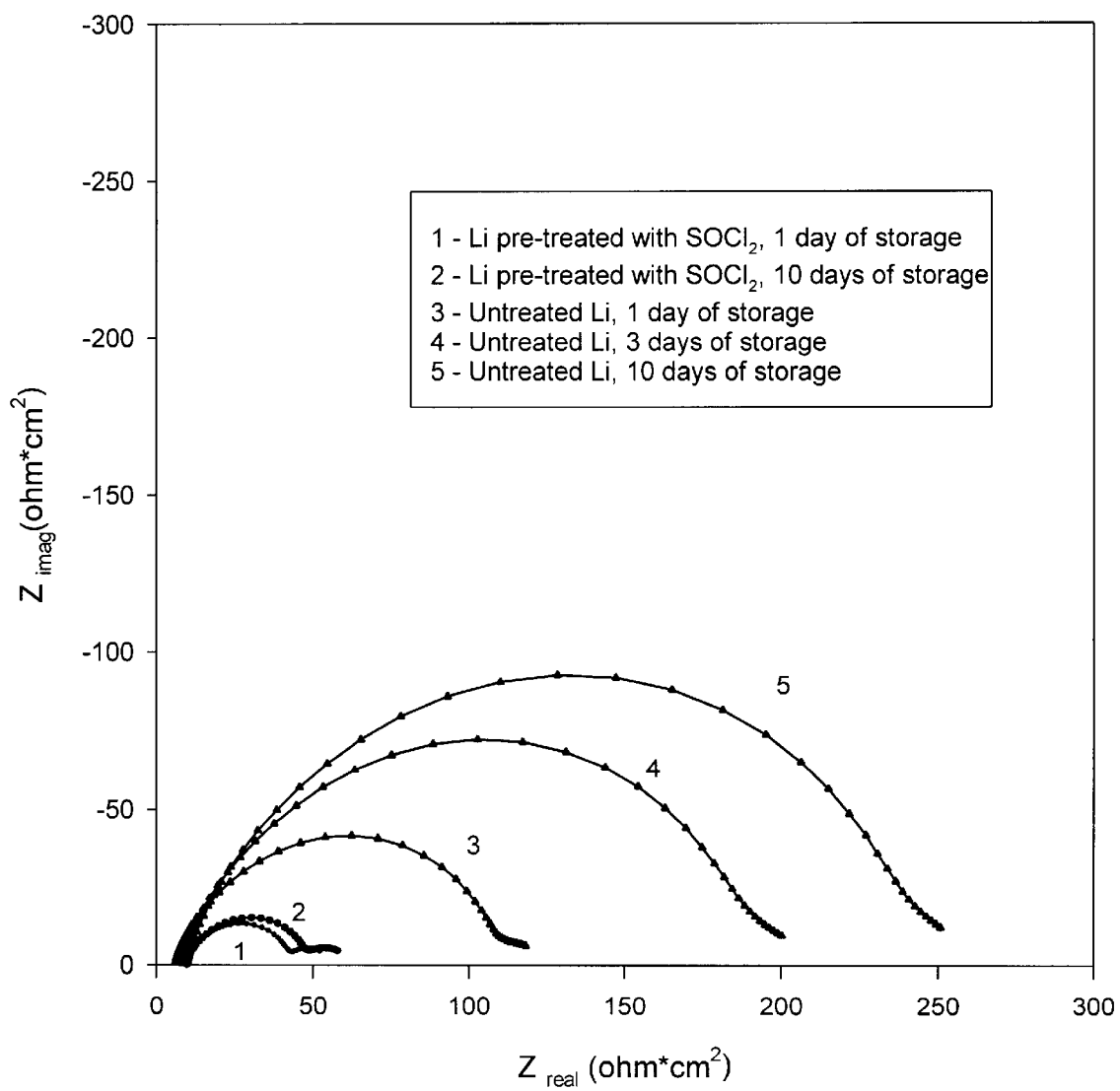
FIG. 7 illustrates effect of Li electrode pretreatment with thionyl chloride on Li electrode impedance in electrolyte containing dissolved polysulfides during cell storage.

An impedance of the interface between the Li electrode and the electrolyte containing dissolved lithium polysulfides was measured in the symmetrical cell with two identical Li electrodes. The solution was 7.5 M sulfur as $Li_2S_8$ dissolved in the mixture of DME and Dioxolane (9:1) with 0.5 M LiTSFI. Impedance measurements were performed during cell storage under open circuit conditions for different time periods. A lithium electrode in a first cell was pretreated with liquid thionyl chloride for 1.5 hourses prior to assembly of the cell while a lithium electrode in a second cell was not pretreated with the thionyl chloride. Besides pre-treatment of the lithium electrode with the liquid thionyl chloride, the first cell and the second cell were essentially similar. The lithium electrode pretreated with thionyl chloride exhibited low and stable interface resistance. The interface resistance of the untreated lithium electrode grew rapidly during storage. An increasing interface resistance is typically consistent with corrosion of the lithium electrode via reaction with the long chain polysulfides dissolved in the solvent mixture. The stable interface resistance of the electrode pretreated with the liquid thionyl chloride indicates the formation of a passivating film that protects the Li electrode from reacting with the polysulfides. After 10 days of storage the interface resistance of the treated electrode is about five times less than the resistance of the untreated one (See FIG. 7).

CONCLUSION

The use of oxidizing agent as a protector for lithium electrodes has been described. Battery cells with the electrolyte containing dissolved oxidizing additives or electrodes pretreated with the oxidizer and then incorporated into the battery cell exhibit improved storageability and increased discharge capacity over cells without oxidizing additives in the electrolyte or without electrodes pretreated with the oxidizing additive. The present invention is applicable to both primary and rechargeable lithium-sulfur batteries. In addition, methods and compositions in accordance with the present invention, including strong oxidizer-pretreated electrodes and electrolytes containing oxidizing additives, may be used in conjunction with other lithium battery cells and fabrication techniques. All references cited in this application are incorporated by reference for all purposes.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A battery cell electrolyte, comprising:
a) a main solvent of an electrolyte solvent mixture, having the chemical formula $R_1(CH_2CH_2O)_nR_2$, where n ranges between 1 and 10, $R_1$ and $R_2$ are different or identical groups selected from the group consisting of alkyl, alkoxy, substituted alkyl, and substituted alkoxy groups; and
b) an oxidizing agent additive comprising no more than about 49% by weight of the electrolyte solvent mixture, oxidizing agent additive being selected from the group consisting of a halogen, an interhalogen, and an oxychloride and combinations thereof.

2. The electrolyte of claim 1, wherein the halogen is selected from the group consisting of $Cl_2$, $Br_2$ and $I_2$.

3. The electrolyte of claim 1, wherein the oxychloride is selected from the group consisting of $SO_2Cl_2$ and $SOCl_2$.

4. The electrolyte of claim 1, wherein the interhalogen is selected from the group consisting of iodine monochloride (ICl), iodine trichloride ($ICl_3$) and iodine monobromide ($I_2Br_2$).

5. The electrolyte of claim 1, further comprising a dioxolane as a co-solvent.

6. The electrolyte of claim 5, wherein the dioxolane co-solvent comprises less than about 20% by weight of the electrolyte solvent mixture.

7. The electrolyte of claim 1, wherein said main solvent is a linear polyether.

8. The electrolyte of claim 1, wherein said main solvent is chosen from the glyme family including monoglyme diglyme, triglyme, and tetraglyme.

9. The electrolyte of claim 1, wherein said main solvent is dimethoxyetane.

10. The electrolyte of claim 1, further comprising a second co-solvent having a donor number of at least about 13.

11. The electrolyte of claim 10, wherein said second co-solvent is at least one of hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimetylphosphate N,N,N'N'-tetraethylsulfamide, tetramethylenediamine, tetramethylpropylenediamine, and pentamethyldiethylenetriamine.

12. The electrolyte of claim 1, further comprising an electrolyte salt.

13. The electrolyte of claim 12, wherein said electrolyte salt is at least one of $LiN(C_2F_5SO_2)_2$, $LiN(CF_3SO_2)_2$, $LiCF_3SO_3$, $LiClO_4$, $LiPF_6$, $LiBF_4$, $LiAsF_6$.

14. The electrolyte of claim 1, wherein said electrolyte is in a liquid state.

15. The electrolyte of claim 1, wherein said electrolyte is in a gel state.

16. The electrolyte of claim 1, wherein said electrolyte is in a solid state.

17. A battery cell comprising:
a) a negative lithium electrode;
b) a positive electrode comprising an electrochemical active material;
c) an electrolyte including a
i) a main solvent of an electrolyte solvent mixture, having the chemical formula $R_1(CH_2CH_2O)_nR_2$, where n ranges between 1 and 10, $R_1$ and $R_2$ are different or identical groups selected from the group consisting of alkyl, alkoxy, substituted alkyl and substituted alkoxy groups; and
ii) an oxidizing agent additive comprising no more than about 49% by weight of the electrolyte solvent mixture, the oxidizing agent additive being selected from the group consisting of a halogen an interhalogen. and an oxychloride and combinations thereof.

18. The battery cell of claim 17, wherein said electrochemically active material comprises sulfur in the form of at least one of elemental sulfur, a metal sulfide, a metal polysulfide, an organosulfur material, and combinations thereof, wherein said metal is selected from the group consisting of alkali metals, alkaline earth metals, and mixtures of alkali and alkaline earth metals.

19. The battery cell of claim 17, wherein said electrochemically active material comprises $Li_2Sg$.

20. The battery cell of claim 17, further comprising a first dioxolane co-solvent, comprising no more than 20% by weight of the electrolyte solvent mixture.

21. The battery cell of claim 17, further comprising a second co-solvent having a donor number of at least about 13.

22. The battery cell of claim 21, wherein said second co-solvent is at least one of hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate N,N,N',N'N-tetraethylsulfitmide, tetramethylenediamine, tetramethylpropylenediamine, and pentamethyldiethylenetriamine.

23. The battery cell of claim 17, further comprising an electrolyte salt.

24. The battery cell of claim 23, wherein said electrolyte salt is at least one of $LiN(C_2F_5SO_2)_2$, $LiN(CF_3SO_2)_2$, $LiCF_3SO_3$, $LiClO_4$, $LiPF_6$, $LiBF_4$, $LiAsF_6$.

25. The battery cell of claim 17, wherein said electrolyte is in a liquid state.

26. The battery cell of claim 17, wherein said electrolyte is in a gel state.

27. The battery cell of claim 17, wherein said electrolyte is in a solid state.

28. The battery cell of claim 17, wherein said electrolyte is a catholyte comprising a dissolved lithium polysulfide.

29. The battery cell of claim 17, wherein the halogen is selected from the group consisting of $Cl_2$, $Br_2$ and $I_2$.

30. The battery cell of claim 17, wherein the oxychloride is selected from the group consisting of $SO_2Cl_2$ and $SOCl_2$.

31. The battery cell of claim 17, wherein the interhalogen is selected from the group consisting of iodine monochloride (ICl), iodine trichloride ($ICl_3$) and iodine monobromide ($I_2Br_2$).

32. The battery cell of claim 17, wherein said lithium negative electrode comprises at lent one material selected from the group consisting of lithium metal, a lithium alloy, and a lithium insertion compound.

33. The battery cell of claim 17, further comprising a dioxolane as an electrolyte co-solvent.

34. The battery cell of claim 17, wherein the dioxolane co-solvent comprises less than about 20% by weight of the electrolyte solvent mixture.

35. The battery cell of claim 17, wherein said solvent is a linear polyether.

36. The battery cell of claim 17, wherein said main solvent is chosen from the glyme family including monoglyme, diglyme, triglyme, and tetraglyme.

37. The battery cell of claim 17, wherein said main solvent is dimethoxyethane.

38. A battery cell electrolyte, consisting essentially of:
  a) a main solvent of an electrolyte solvent mixture, having the chemical formula $R_1(CH_2CH_2O)_nR_2$, where ranges between 1 and 10, $R_1$ and $R_2$ are different or identical groups selected from the group consisting of alkyl, alkoxy, substituted alkyl, and substituted alkoxy groups; and
  c) a sulfur dioxide oxidizing agent additive comprising no more than about 49% by weight of the electrolyte solvent mixture.

39. The electrolyte of claim 38, wherein the electrolyte contains about 3.2% by weight sulfur dioxide.

40. The electrolyte of claim 38, wherein said electrolyte is in a liquid state.

41. The electrolyte of claim 38, wherein said electrolyte is in a gel state.

42. The electrolyte of claim 38, wherein said electrolyte is in a solid state.

43. A battery cell comprising:
  b) a negative lithium electrode;
  b) a positive electrode comprising an electrochemically active material;
  c) an electrolyte including a
    i) a main solvent of an electrolyte solvent mixture, having the chemical formula $R_1 (CH_2CH_2O)_nR_2$, where n ranges between 1 and 10, $R_1$ and $R_2$ are different or identical groups selected from the group consisting of alkyl alkoxy, substituted alkyl, and substituted alkoxy groups; and
    ii) a sulfur dioxide oxidizing agent additive comprising no more than about 49% by weight of the electrolyte solvent mixture.

44. The cell of claim 43, wherein the electrolyte contains about 3.2% by weight sulfur dioxide.

45. The electrolyte of claim 43, wherein said electrolyte is in a liquid state.

46. The electrolyte of claim 43, wherein said electrolyte is in a gel state.

47. The electrolyte of claim 43, wherein said electrolyte is in a solid state.

* * * * *